UNITED STATES PATENT OFFICE.

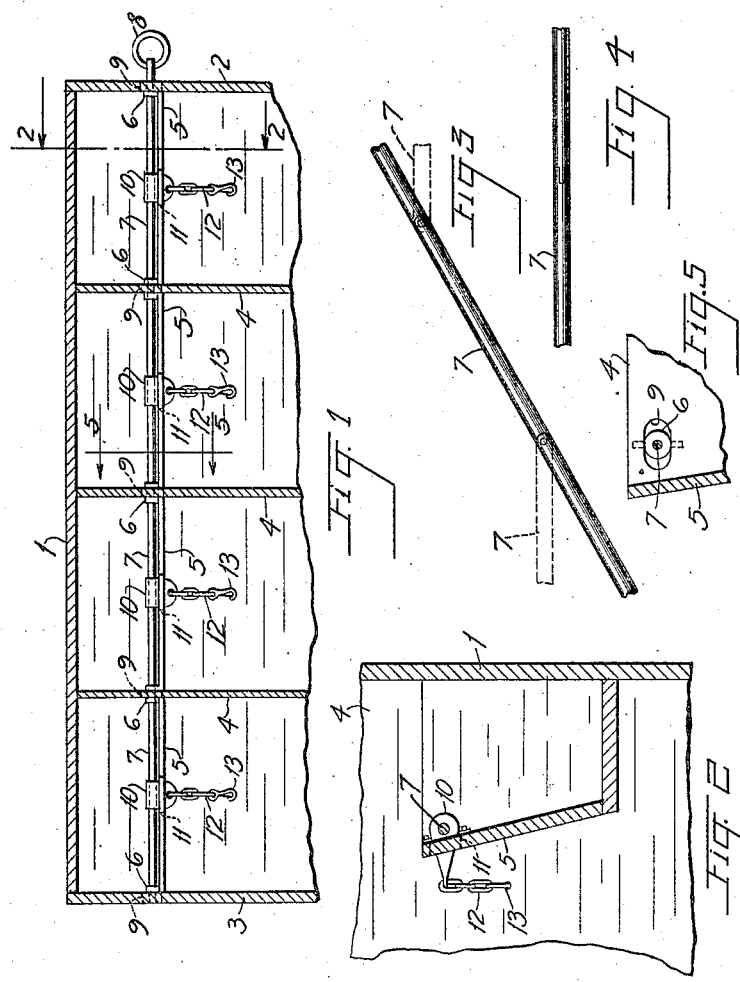

NELS P. ROSLUND, OF MACWORTH, SASKATCHEWAN, CANADA.

ANIMAL-RELEASING DEVICE.

1,419,989.  Specification of Letters Patent.  Patented June 20, 1922.

Application filed December 9, 1920. Serial No. 429,580.

*To all whom it may concern:*

Be it known that I, NELS P. ROSLUND, a citizen of Great Britain, residing at Macworth, in the Province of Saskatchewan and Dominion of Canada, have invented certain new and useful Improvements in Animal-Releasing Devices, of which the following is a specification.

This invention relates to improvements in animal releasing devices and its object is to provide means whereby a number of animals are normally confined in a series of stalls in a stable and whereby they may be simultaneously released in time of necessity. A further object is to provide means of this character that may be installed in a stable in which the stalls may or may not be arranged in a straight line, some of the stalls may be positioned at right angles to others, or the stalls may be arranged in a circle without in any way interfering with the operation of the invention.

With the foregoing and other objects in view the invention consists in the combination and arrangement of parts to be hereinafter fully described, pointed out in the appended claims and illustrated in the accompanying drawing which forms a part of this application, and in which—

Fig. 1 is a fragmentary plan view of a series of stalls in a stable equipped with my improved device.

Fig. 2 is a cross section, enlarged, taken on line 2—2 of Fig. 1.

Fig. 3 is an enlarged fragmentary view of the sectional pull rod employed, the dotted lines denoting possible positions of the rod sections.

Fig. 4 is a plan view of Fig. 3.

Fig. 5 is a section on line 5—5 of Fig. 1.

Like reference characters denote corresponding parts throughout the several views.

The reference numeral 1 denotes one side wall of a stable, 2 and 3 the end walls, 4 the interior stall partitions and 5 the feed troughs. Extending through the several stalls and supported in bearings 6 in the stall partitions is the pull rod formed of a plurality of pivotally connected sections 7, said rod extending through the end wall 2 and being provided with the hand ring 8. It will be noted that the bearings 6 are pivotally arranged in elongated slots 9 formed in the stall partitions so that the bearings may automatically accommodate themselves to the movement or pull of the rod 7.

Each section 7 of the pull rod is preferably of a length equal to the width of a stall and each rod section carries a tapered casting 10 that extends through a slot 11 formed in the feed trough wall, said slots being of such size as to permit the complete withdrawal of the castings 10 when they are disconnected from the pull rod 7. Each casting carries a chain 12 provided terminally with a snap hook 13 by means of which an animal is hitched in the stall in the usual manner. To release one animal at a time the snap hook 13 is manually disengaged from the animal's bit. To release all of the animals simultaneously the operator from outside the stable removes the pull rod from the stable by means of the hand ring 8 thus freeing all of the castings 10 thus freeing the animals and permitting them to leave the stable, taking the castings, chains and snap hooks with them. The device is reassembled by two persons one inserts the rod 7 through the several stalls from outside the stable while the other, inside the stable, applies the castings 10 in the several stalls.

What is claimed is:—

1. In an animal releasing device, a plurality of pivotally supported bearings, a sectional pull rod releasably supported in said bearings, a handle for said pull rod, tapered castings releasably carried by said pull rod, and snap hooks carried by said castings.

2. In an animal releasing device, a plurality of pivotally supported bearings, a sectional pull rod releasably supported in said bearings, the sections of said pull rod being pivotally connected, a handle for said pull rod, tapered castings releasably carried by said pull rod, and snap hooks carried by said castings.

In testimony that I claim the foregoing as my own I have hereto affixed my signature in the presence of two subscribing witnesses.

NELS P. ROSLUND.

Witnesses:
 MARTIN JOHNSON,
 GEORGE JOHNSON.